(12) United States Patent
Hirano et al.

(10) Patent No.: US 7,450,333 B2
(45) Date of Patent: Nov. 11, 2008

(54) ELECTROSTATIC FLY-HEIGHT CONTROL

(75) Inventors: Toshiki Hirano, Sab Jose, CA (US);
Bernhard E. Knigge, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/647,970

(22) Filed: Dec. 29, 2006

(65) Prior Publication Data

US 2008/0158715 A1 Jul. 3, 2008

(51) Int. Cl.
*G11B 21/02* (2006.01)
*G11B 21/24* (2006.01)
(52) U.S. Cl. .................................. 360/75; 360/294.7
(58) Field of Classification Search .................. None
See application file for complete search history.

(56) References Cited

U.S. PATENT DOCUMENTS

| | | | |
|---|---|---|---|
| 3,860,918 A | 1/1975 | Cencel | |
| 4,605,977 A | 8/1986 | Matthews | |
| 4,931,887 A | 6/1990 | Hegde et al. | |
| 6,359,746 B1 | 3/2002 | Kakekado et al. | |
| 6,366,416 B1 | 4/2002 | Meyer et al. | |
| 6,529,342 B1 | 3/2003 | Feng et al. | |
| 6,728,050 B2 | 4/2004 | Wilson | |
| 6,876,509 B2 * | 4/2005 | Bonin et al. | 360/75 |
| 2002/0118483 A1 | 8/2002 | Meyer et al. | |
| 2003/0058571 A1 * | 3/2003 | Kisaka | 360/78.04 |
| 2003/0169526 A1 | 9/2003 | Minoshima et al. | |
| 2007/0253090 A1 * | 11/2007 | Hirano et al. | 360/75 |

OTHER PUBLICATIONS

Carmichael, M. W., et al., "Capacitance Probe", https://www.delphion.com/tdbs/tdb?order=78A+02063, (May 1977),1.
Klaassen, K B., "Capacitive Servo Detector", https://www.delphion.com/tdbs/tdb?order=83A+62555, (Nov. 1983),1-3.

* cited by examiner

*Primary Examiner*—Jason C Olson

(57) ABSTRACT

A mechanism for maintaining a constant fly-height of a slider comprises a capacitive fly-height change sensor and an electrostatic fly-height controller. The capacitive fly-height change sensor is configured for coupling with the slider, which is in a head gimbal assembly. The capacitive fly-height change sensor is also configured for measuring a capacitance between the slider and a surface of a disk through the use of a fly-height change sensing signal, and outputting a sensor voltage which is substantially proportional to a sensed change in said capacitance. The electrostatic fly-height controller is coupled with the capacitive fly-height change sensor and configured to couple with the slider. The electrostatic fly-height controller is configured to process the sensor voltage into a fly-height control signal for electrostatically maintaining a constant fly-height of the slider relative to the surface of the disk.

18 Claims, 7 Drawing Sheets

ELECTROSTATIC FLY-HEIGHT CONTROL

TECHNICAL FIELD

Embodiments of the present technology relate to the field of hard disk drive development and slider fly-height control.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), Moving Picture Experts Group audio layer 3 (MP3) players, and the like. For example, the original hard disk drive had a disk diameter of 24 inches. Modern hard disk drives are much smaller and include disk diameters of less than 2.5 inches. Advances in magnetic recording are also primary reasons for the reduction in size.

However, the small drives have small components with very narrow tolerances. Disk drive sliders are designed to fly in very close proximity to the disk surface. For instance, in some systems the slider may be designed to fly only three to five nanometers above the disk surface. In a system with such close tolerances, components can be subject to van der Waals, Meniscus, electrostatic, spindle motor charge up, and contact potential forces. These forces are due to a variety of causes, such as: the molecular attraction of components in very close proximity; adhesive friction caused by contact between the slider and the lubricant on the disk; the build up of electrical potential between the disk and the slider caused by the rotating disk surface (tribo-charging); the build up of electrical potential in motor bearings (tribo-charging); potential difference that exists between two different metals (different Fermi levels of slider and disk material); and impacts between the slider and disk surface. These forces alone, and in combination, create bouncing vibrations of the slider which contribute to undesirable fluctuations of the fly-height of the slider.

Bouncing vibrations of the slider are undesirable because they can cause media damage. Bouncing vibrations also cause variations in the magnetic spacing between the head element and media (due to fluctuations in fly-height) that are likely to cause data errors—both hard errors during writing and soft errors during reading.

SUMMARY OF THE INVENTION

A mechanism for maintaining a constant fly-height of a slider comprises a capacitive fly-height change sensor and an electrostatic fly-height controller. The capacitive fly-height change sensor is configured for coupling with the slider, which is in a head gimbal assembly. The capacitive fly-height change sensor is also configured for measuring a capacitance between the slider and a surface of a disk through the use of a fly-height change sensing signal, and outputting a sensor voltage which is substantially proportional to a sensed change in said capacitance. The electrostatic fly-height controller is coupled with the capacitive fly-height change sensor and configured to couple with the slider. The electrostatic fly-height controller is configured to process the sensor voltage into a fly-height control signal for electrostatically maintaining a constant fly-height of the slider relative to the surface of the disk.

BRIEF DESCRIPTION OF THE FIGURES

The figures referred to in this description should be understood as not being drawn to scale unless specifically noted.

DETAILED DESCRIPTION

Reference will now be made in detail to the alternative embodiments of the present technology. While of the present technology will be described in conjunction with the alternative embodiments, it will be understood that they are not intended to limit the present technology to these embodiments. On the contrary, embodiments of the present technology are intended to cover alternatives, modifications and equivalents, which may be included within the spirit and scope of the embodiments as defined by the appended claims.

Furthermore, in the following detailed description, numerous specific details are set forth in order to provide a thorough understanding of embodiments of the present technology. However, it will be recognized by one of ordinary skill in the art that embodiments may be practiced without these specific details. In other instances, well known methods, procedures, components, and circuits have not been described in detail as not to unnecessarily obscure aspects of embodiments of the present technology.

The discussion will begin with a brief overview of disk drive operation, focusing on the slider as it is utilized in the disk drive. Some of the forces that contribute slider bounce vibrations will be discussed. A mechanism for maintaining a constant fly-height of a slider then be described generally, and then in greater detail. Finally, a graph will be described which presents example results from the use of one embodiment of the mechanism for maintaining a constant fly-height of a slider.

Figure 1:
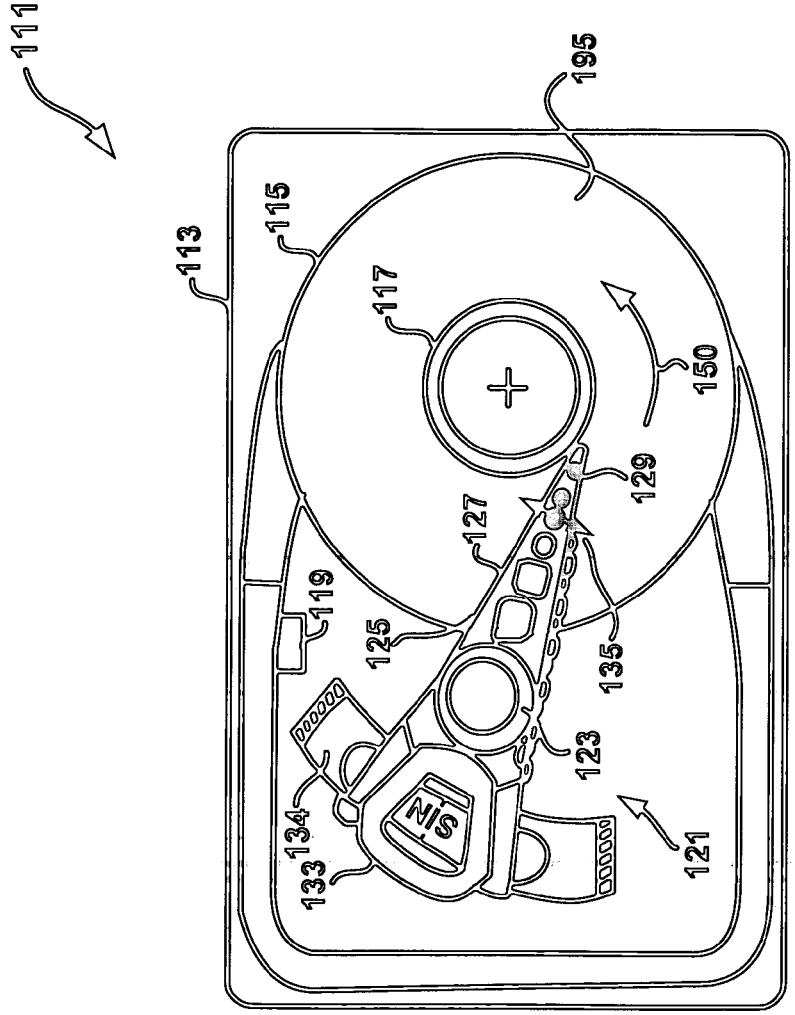
FIG. 1 is a schematic top plan view of an example hard disk drive, in accordance with one embodiment of the present technology.

FIG. 1 shows a schematic drawing of one embodiment of an information storage system comprising a magnetic hard disk file or drive 111 for a computer system. Hard disk drive 111 has an outer housing or base 113 containing a disk pack having at least one media or magnetic disk 115. The disk pack (as represented by disk 115) defines an axis of rotation and a radial direction relative to the axis in which the disk pack is rotatable. A spindle motor assembly having a central drive hub 117 operates as this axis and rotates the disk 115 or disks of the disk pack in the radial direction shown by arrow 150, relative to housing 113. An actuator 121 comprises a plurality of parallel actuator arms 125 (one shown) in the form of a comb that is movably or pivotally mounted to base/housing 113 about a pivot assembly 123. A controller 119 is also mounted to base 113 for selectively moving the comb of arms 125 relative to the disk pack (as represented by disk 115).

In the embodiment shown in FIG. 1, each arm 125 has extending from it at least one cantilevered integrated lead suspension (ILS) 129. The ILS 129 may be any form of lead suspension that can be used in a data access storage device, such as a hard disk drive (HDD). The slider 230 (see FIG. 2) is usually bonded to the end of ILS 129, both of which are attached to a suspension 127. Suspension 127, in this embodiment, is used as a pathway to provide an electrical connection to the slider 230 (see FIG. 2). Portions of slider 230 (see FIG. 2 and FIG. 3), in this embodiment, are electrically isolated from ground, and in some embodiments are also electrically isolated from suspension 127. The level of integration containing the slider, suspension, ILS, and read/write head (not shown) is called the Head Gimbal Assembly (HGA).

The ILS 129 has a spring-like quality, which biases or presses the air-bearing surface of slider 230 (see FIG. 2) against disk 115 to cause slider 230 (see FIG. 2) to fly at a precise distance from disk 115. ILS 129 has a hinge area that provides for the spring-like quality, and a flexing interconnect that supports read and write traces and electrical connections through the hinge area. A voice coil 133, free to move within a conventional voice coil motor magnet assembly 134 (top pole not shown), is also mounted to actuator arms 125 opposite the head gimbal assemblies. Movement of the actuator 121 (indicated by arrow 135) by controller 119 causes the head gimbal assemblies to move along radial arcs across tracks on the surface 195 of disk 115 until the heads settle on their set target tracks. The head gimbal assemblies operate in a conventional manner and always move in unison with one another, unless drive 111 uses multiple independent actuators (not shown) wherein the arms can move independently of one another.

Figure 2:
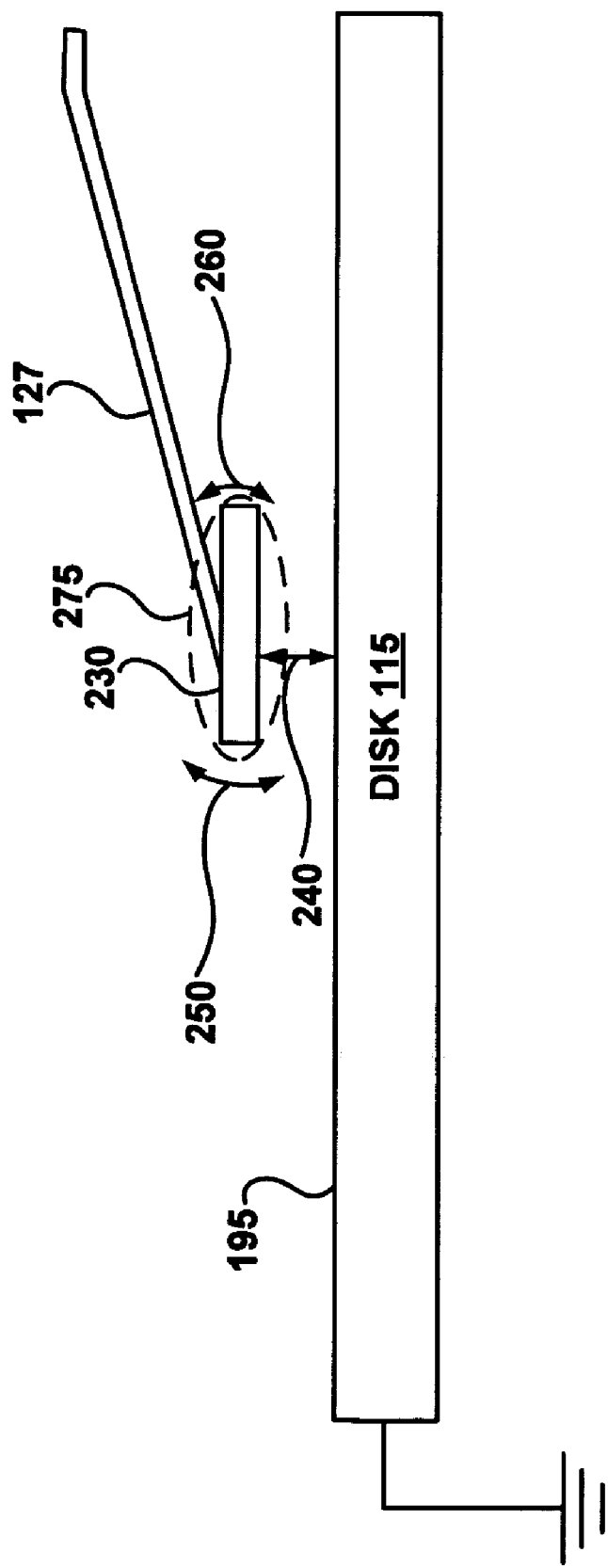
FIG. 2 is a side view of an example suspension with attached slider, suspended over a disk, in accordance with one embodiment of the present technology.

FIG. 2 shows a side view of an exemplary suspension 127 with a slider 230 attached to the end of it. Slider 230, shown suspended by suspension 127 over surface 195 of disk 115, is designed to fly in close proximity to the surface of disk 115. The arrow 240 represents the fly-height of slider 230, which can be only nanometers above the surface 195 of disk 115. As previously explained, suspension 127 provides a conduit for an electrical connection to slider 230, but may itself be electrically isolated from slider 230, from ground, or from both. Area 275 represents a detail, which is shown in FIG. 3.

Figure 3:
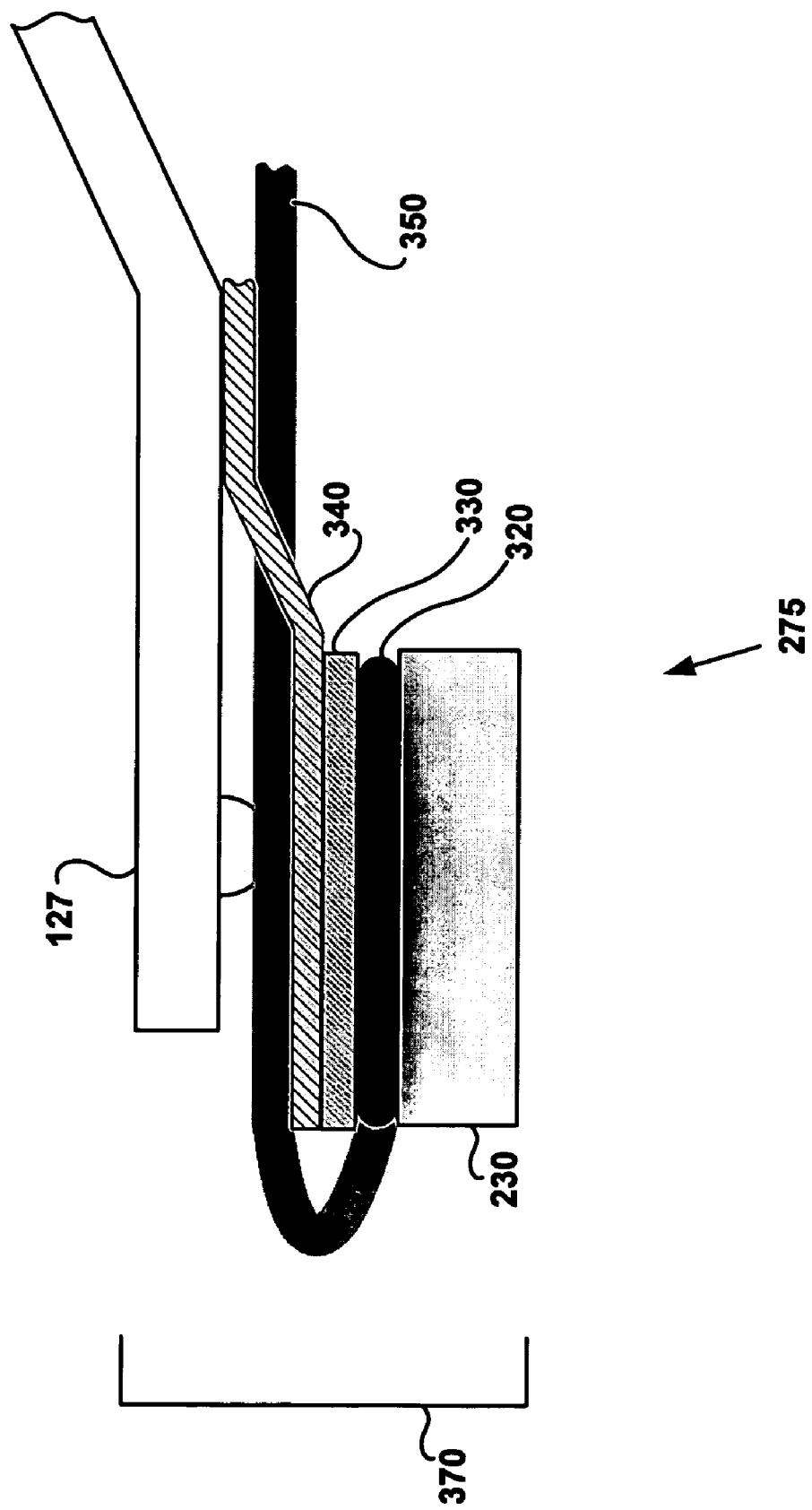
FIG. 3 shows a side view detail of an example slider which is used with some embodiments of the present technology.

FIG. 3 shows a side view detail 275 of an example slider 230 which may be used with embodiments of the present technology, such as hard disk drive 111. In detail 275, suspension 127 is shown coupled with slider 230. Head Gimbal Assembly (HGA) 370 (see FIG. 3) is comprised of a flexure 340, slider 230, and suspension 127. An insulator layer 330, such as, for example, a polyimide coating, is added to electrically isolate flexure 340 and suspension 127 from slider 230. In one embodiment, a conductor layer 320, such as, for example, gold or copper, is added between insulator layer 330 and the slider 230. This provides an electrical coupling for signal line 350 to apply control signals, sensing signals, and/or bias voltages to slider 230, without such signals and bias voltages also being coupled to suspension 127. In another embodiment, such an electrical coupling is made, for example, by coupling signal line 350 to a bonding pad on slider 230.

With further reference to FIG. 2 and FIG. 1, small drives in use today have small components with very narrow tolerances. In some systems slider 230 may be designed to fly only three nanometers (or even less) above surface 195 of disk 115, while in others, the aim may be to actually put slider 230 into contact with surface 195 of disk 115. In disk drives with such close tolerances, components such as slider 230 can be subject to van der Waals, Meniscus, electrostatic, spindle motor charge up, contact potential, and impact forces.

These forces are due to a variety of causes, such as: the molecular attraction between components in very close proximity; adhesive friction caused by contact between slider 230 and the lubricant on disk 115; the build up of electrical potential between disk 115 and slider 230 caused by the rotating surface 195 of disk 115 (tribo-charging); the build up of electrical potential at the motor bearings leading to a charged disk 115 (tribo-charging); the potential difference that exists between two dissimilar materials (i.e. different Fermi-levels of slider and disk material), and friction and contact between slider 230 and surface 195 of disk 115. These forces alone, and in combination, create bouncing vibrations in slider 230 that can cause media damage and can also cause data loss during read and write operations. Air bearing vibrations are a type of bounce vibrations.

Air bearing vibrations act on the slider in several modes, called Roll, first Pitch mode, and second Pitch mode vibration. In today's disk drives with pico-sized sliders, the frequency range that includes the particular air bearing vibration modes of interest in the present invention is between approximately 50 kHz and approximately 500 kHz. In a typical pico slider this frequency range substantially encompasses the second pitch mode of vibration, which has a center frequency of in the vicinity of 240 kHz to 250 kHz in a typical pico slider. The present invention is mainly concerned with actively counteracting bouncing vibrations in the second pitch mode. These "Pitch 2 mode" vibrations create the most problems with read/write errors and media damage.

In FIG. 2, arrows 250 and 260 show the direction of up/down motion imparted to a slider 230 experiencing Pitch 2 mode vibrations. The up/down motion (250 and 260) has a velocity that can be measured. The up and down motions (250 and 260) of a typical pico slider, such as slider 230, typically peak at a frequency of around 240 kHz-250 kHz. With a slider fly-height of, for example, three nanometers above surface 195 of disk 115, a goal might be, for instance, to keep bounce vibrations to plus or minus one nanometer of dynamic modulation of slider 230. This is very difficult with passive damping when a single force, such as friction can cause bounce vibrations of twenty to thirty nanometers.

Mechanism for Control of Slider Fly-Height

Embodiments of the present technology provide a way to electrostatically control and stabile the fly-height of a slider in response to sensed changes in fly-height. In brief, embodiments of the present technology sense changes in fly-height by measuring a capacitance between the slider and the disk it flies above. Measurements of capacitance change are output as a sensor voltage which is substantially proportional to a sensed change in capacitance (and thus also proportional to a change in fly-height). This sensor voltage is then used as an input to an electrostatic fly-height controller, which couples a fly-height control signal with the slider to increase or decrease the electrostatic attraction between the slider and the surface of disk the disk it flies above. In one embodiment, this fly-height control signal is filtered, such that it focuses on dampening or eliminating a specific mode or modes of bounce vibrations (such as pitch 2 mode vibrations) with electrostatic feedback. Other vibration modes may be damped in the manner described herein, however, by focusing on dampening a mode or modes of vibration (such as pitch 2 mode vibration) embodiments of the present technology increase stability of the slider and operate to stabilize and control fly-height of the slider.

Figure 4:
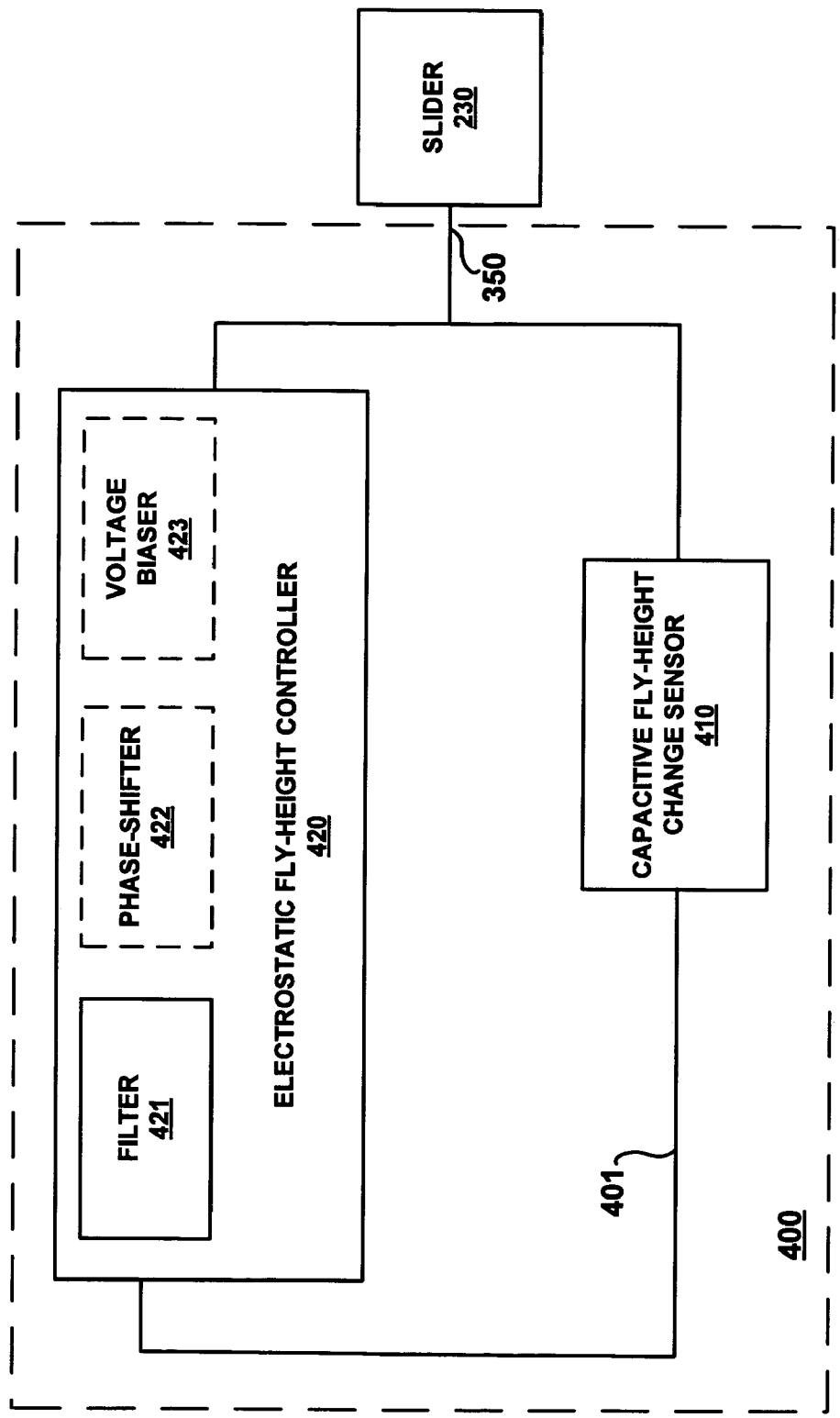
FIG. 4 shows a block diagram of a mechanism for maintaining a constant fly-height of a slider, in accordance with one embodiment of the present technology.

FIG. 4 shows a block diagram of a mechanism 400 for maintaining a constant fly-height of a slider, in accordance with one embodiment of the present technology. In various embodiments, mechanism 400 is used, for example, with slider 230 (FIG. 2 and FIG. 3) and hard disk drive 111 (FIG. 1) to maintain or stabilize fly-height of slider 230. Throughout the description of mechanism 400, slider 230 shown in FIG. 2 and FIG. 3, will be used as an example. It is appreciated, however, that other slider configurations may be utilized with mechanism 400 provided that the slider is insulated from ground and from its suspension, and also provided that there is an electrical coupling by which signals and/or bias voltages may be coupled to the slider.

Mechanism 400 is comprised of a capacitive fly-height change sensor 410 and an electrostatic fly-height controller 420. As shown in FIG. 4, capacitive fly-height change sensor 410 is coupled to slider 230 of HGA 370 and also to electrostatic fly height controller 420. Electrostatic fly-height controller 420 is also coupled to slider 230. In one embodiment, as shown in FIG. 4, mechanism 400 and slider 230 are coupled together to form a closed-loop for sensing fly-height changes of slider 230 and then applying an electrostatic force to counteract the sensed changes in fly-height and thereby control the fly-height of slider 230.

As shown in the block diagram of the embodiment represented by FIG. 4, capacitive fly-height change sensor 410 is coupled with slider 230 for measuring capacitance between slider 230 and surface 195 of disk 115 through the use of a fly-height change sensing signal. In one embodiment, the fly-height change sensing signal is applied to slider 230, for example via signal line 350. Capacitive fly-height change sensor 410 outputs a sensor voltage which is substantially proportional to a sensed change in said the measured capacitance. This sensor voltage is coupled to electrostatic fly-height controller 420, for example via signal line 401, and is used as an input for determining an electrostatic fly height control signal to counteract the sensed change in fly-height (which the sensor voltage represents).

When a slider, such as slider 230 is flying over a disk, such as disk 115, there is a small gap between the two due to the fly height 20. In such a situation, slider 230 and surface 195 of disk 215 act as parallel plates of a capacitor. The capacitance between these parallel plates can be defined as $C=e \ A/g$; where "e" is the permittivity of air ($\approx 9 \times 10^{-12}$); "A"=area; and "g"=the gap. For example, a slider with a trailing pad size of 200 µm by 200 µm and a fly height of 10 nm would generate a capacitance of approximately 36 pF. In this example, a fly-height change of 1 nm will result in a capacitance change of approximately 3.6 pF. Changes in the fly-height (or gap) between surface 195 and slider 230 are measured by detecting this capacitance and monitoring changes in this capacitance using capacitive fly-height change sensor 410.

As shown in the block diagram of the embodiment represented by FIG. 4, electrostatic fly-height controller 420 is coupled with capacitive fly-height change sensor 410 and is also coupled with slider 230 of HGA 370. Electrostatic fly-height controller 420 processes a received sensor voltage into a fly-height control signal. The fly-height control signal is then applied to slider 230, for example via signal line 350. The fly-height control signal is for electrostatically maintaining a constant fly-height of slider 230 relative to surface 195 of disk 115. In one embodiment, as shown by FIG. 4, the fly-height control signal is applied simultaneously via the same signal line (such as signal line 350) to slider 230.

Since the same electrical coupling (signal line 350 for example) is used for simultaneously sensing and driving a fly-height, capacitive fly-height change sensor 410 is designed, in one embodiment, such that the driving signal (fly-height control signal) from electrostatic fly-height controller 420 does not affect the sensing signal (fly-height change sensing signal) which capacitive fly-height change sensor 410 uses to sense changes in capacitance due to changes in fly-height. This problem is called "feed through" and can be avoided in at least two ways; first by frequency separation and second by differential sensing. By avoiding the feed through problem, a single electrical coupling (signal line 350 for example) is used to simultaneously couple both the fly-height change sensing signal and the fly-height control signal to slider 230.

In frequency separation, the sensing (fly-height change sensing signal) and driving signals (fly-height control signal) are at distinctly separated frequencies. For example, in one embodiment, the driving signal is around 250 kHz (which is close to the center frequency of pitch 2 mode vibration in a pico slider), while the sensing signal is a high frequency AC signal of around 3 MHz. In this example, the approximately ten-fold difference between the frequency of the sensing signal and the driving signal provides frequency separation which allows both signals to be simultaneously applied over a signal line and to a slider without interfering with one another. Similarly, in this embodiment, the approximately ten-fold difference between the sensing signal and the drive signal means that the sensing signal is at a "high frequency" relative to the drive signal.

Figure 6:
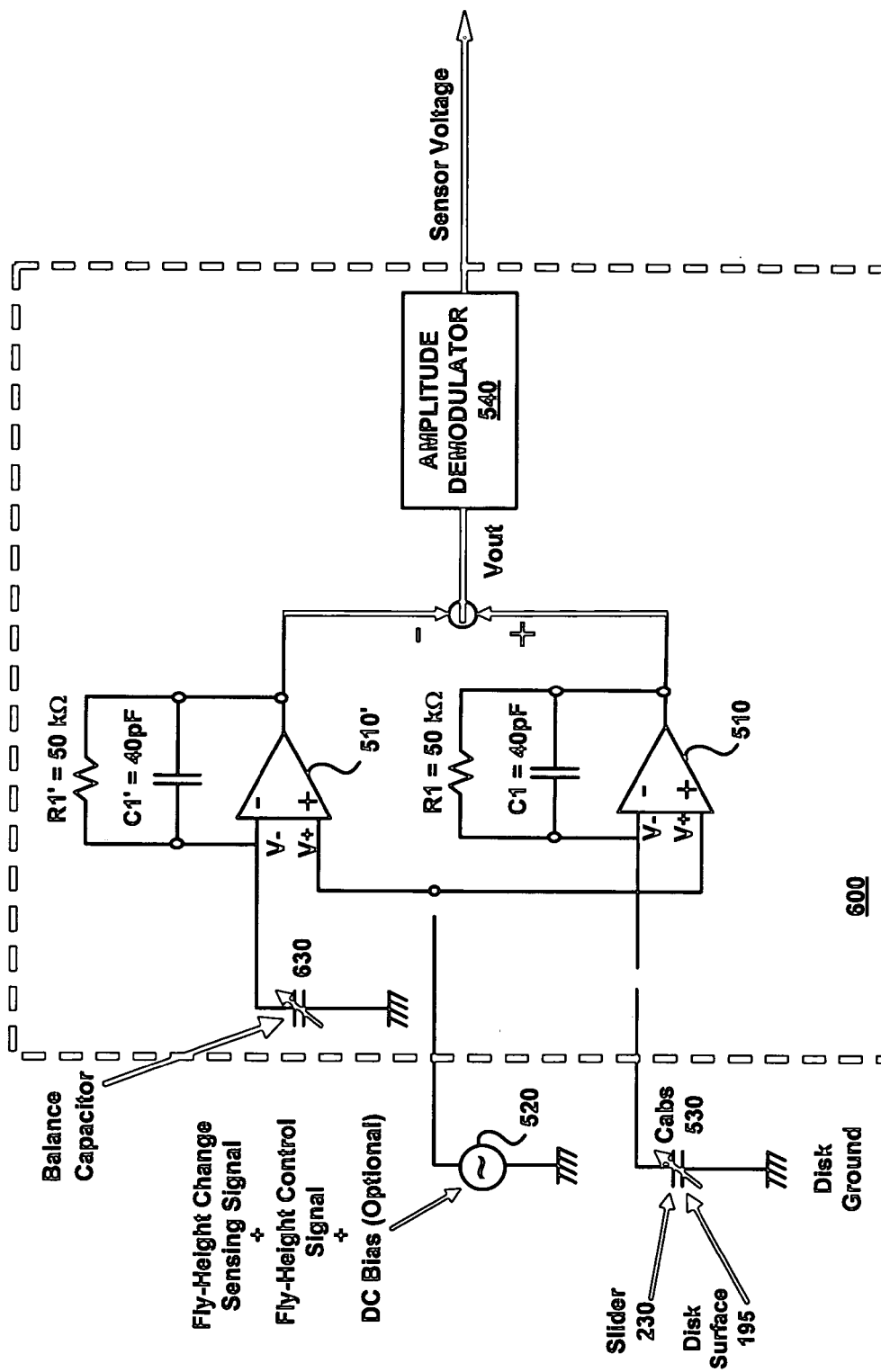
FIG. 6 shows an example of another circuit used in a capacitive fly-height change sensor, in accordance with an embodiment of the present technology.

In differential sensing, a "dummy" capacitance, which is fixed to represent a steady state value of the capacitance between the slider and the disk surface, is sensed in parallel with the slider/disk surface capacitance. The dummy capacitance is then compared to the slider/disk surface capacitance to eliminate errors caused by the driving signal (fly-height control signal). An example of the use of such a dummy capacitance is illustrated in FIG. 6.

In one embodiment, electrostatic fly-height controller 420 comprises a filter 421 for selecting a frequency range of an electrostatic fly-height control signal which is output from electrostatic fly-height controller 420 and coupled to slider 230 (for example via signal line 350). In one embodiment, filter 421 is a band pass filter with a center frequency tuned substantially to a second pitch mode frequency of a slider which electrostatic fly-height controller 420 is coupled to. For example, in one such embodiment, filter 421 comprises a band pass filter with a center frequency of approximately 250 kHz, which passes a frequency range that is between approximately 50 kHz and approximately 500 kHz. In another such embodiment, filter 421 comprises a band pass filter with a center frequency of approximately 250 kHz, which passes a frequency range that is between approximately 200 kHz and approximately 300 kHz. In yet another embodiment, filter 421 comprises a low pass filter which passes a frequency range, for example, of all frequencies less than 500 kHz. Each of these cases operates to shape a fly-height control signal that is in the frequency range of the pitch 2 mode vibration range of a typical pico slider. In yet another embodiment, filter 421 comprises an all pass filter which passes all frequencies.

In one embodiment, electrostatic fly-height controller 420 also comprises an optional phase shifter 422 which shifts the phase of an electrostatic fly-height control signal, which is output from electrostatic fly-height controller 420 and coupled to slider 230 (for example via signal line 350). Optional phase-shifter 422 may be incorporated for several reasons. First, phase-shifter 422 gives a means to control the phase of the frequency of the fly-height control that is eventually fed back into slider 230 over signal line 350. Maximum damping of bounce vibrations in the air bearing range occurs if the maximum voltage is applied at the maximum velocity. This is accomplished with a zero degree phase difference in the actual slider velocity (which is sensed as a change in capacitance by capacitive fly-height change sensor 410) and the fly-height control signal sent to the slider 230 over signal line 350. Less damping or even amplification may occur at other phase differences. Second, some signal processing, such as filtering, inherently causes phase shifts. If these phase shifts, or other phase shifts, need to be compensated for, a phase-shifter 422 is added to electrostatic fly-height controller 420.

In one embodiment, electrostatic fly-height controller 420 also comprises an optional voltage biaser 423 which applies a small bias voltage to slider 230 (for example via signal line 350). This small bias voltage is in addition to the electrostatic fly-height control signal which is output from electrostatic fly-height controller 420 and coupled to slider 230. In one embodiment, this small bias voltage is a DC (direct current) voltage of less than approximately 500 mV. In one embodiment, for example, a DC bias voltage of approximately 350 mV is used. As will be discussed further below, the small bias voltage is added to linearize the otherwise non-linear relationship between the fly-height control signal and the electrostatic force generated between the slider and the surface of the disk as a result of the alternating voltage of the fly-height control signal. In some embodiments, the surface potential of the disk may reduce the magnitude of a bias voltage which needs to be applied to achieve linearization. Similarly, in some embodiments the surface potential of the disk is sufficient to achieve linearization, and as such a DC bias voltage need not be applied.

The electrostatic force between a disk, such as disk 115, and a slider, such as slider 230 is represented by the equation:

$$F \cong \frac{eAV^2}{2g^2};$$

where V=voltage across the air gap (fly-height) between disk 115 and slider 230; A=plate area; g=gap (or fly-height); and e=permittivity of air. An order estimate shows that F=1.8 mN per Volt applied to the slider. Assuming an Air Bearing Surface (ABS) stiffness of approximately 0.4 nm/mN (which is typical for a pico slider), fly-height change is approximately 0.7 nm/1V applied to the slider. Moreover, in the pitch two mode frequency range, amplitude is magnified by up to 20 to 50 times due resonance.

As previously indicated, linearization of the relationship between the fly-height control signal and the electrostatic force applied is accomplished by applying a small DC bias voltage. By realizing that the electrostatic force is proportional to the voltage squared and assuming that permittivity, area, and gap are constant (k), the following relationship is evident: F F≅k(Vb+V)²=k(Vb²+2VbV+V²); where Vb is a DC bias voltage, and V is the alternating voltage of the fly-height control signal. Thus, where V is very small compared to Vb, the equation can be represented as F≅kVb²+2kVbV and force will be substantially linear to V (the voltage of the fly-height control signal).

Figure 5:
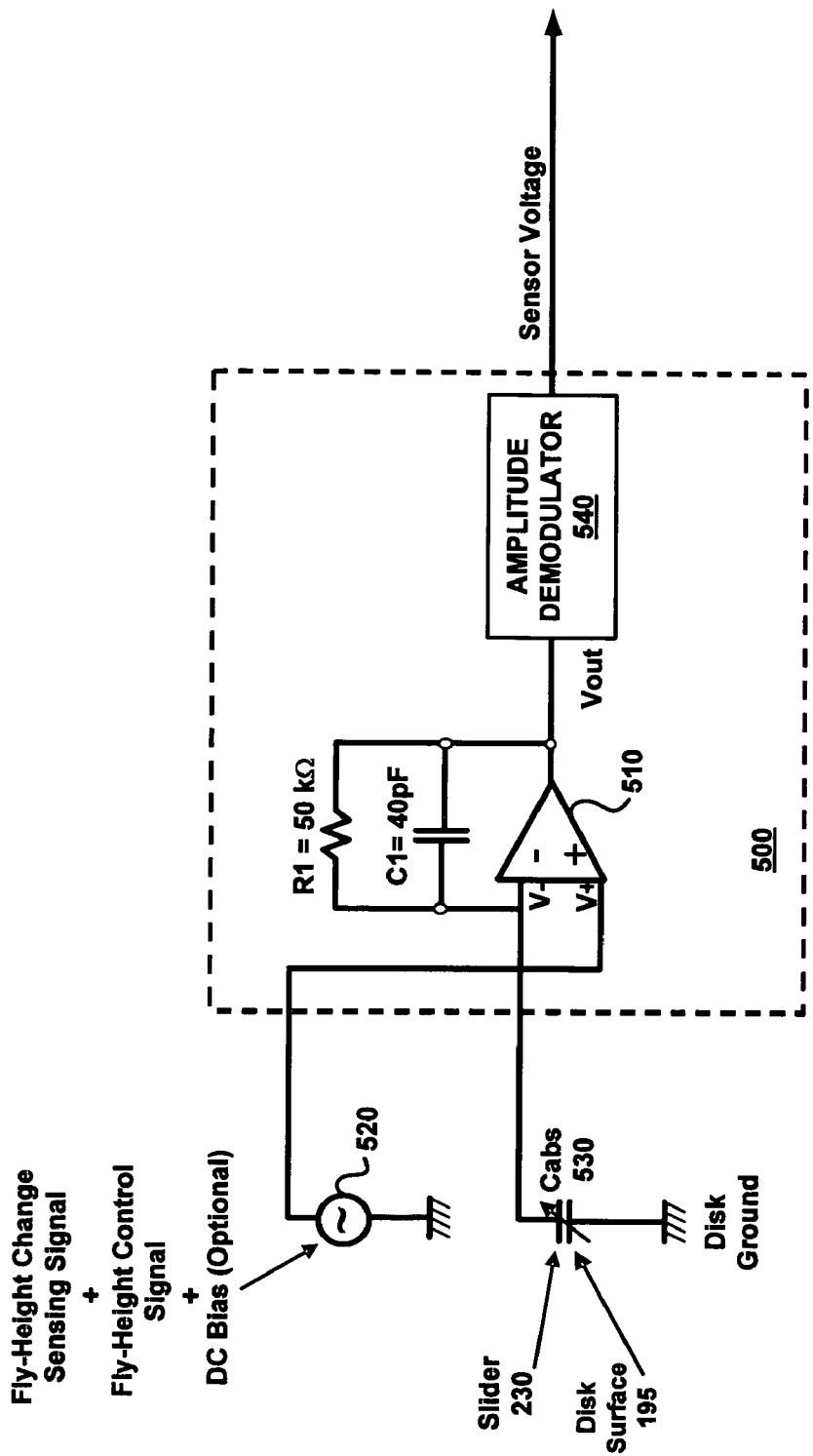
FIG. 5 shows an example of a circuit used in a capacitive fly-height change sensor, in accordance with an embodiment of the present technology.

FIG. 5 shows an example of a circuit 500 used in a capacitive fly-height change sensor 410, in an embodiment of the present technology. Circuit 500 is an example circuit configured to operate with the pico slider (previously described) which generates a steady state capacitance, "Cabs" 530 (Capacitance of Air Bearing Surface), of approximately 36 pF in the air gap between slider 230 and surface 195 of disk 115. It is appreciated that the component values shown may vary with other sizes of sliders or sliders having a steady state Cabs of a different value. In operation, the fly-height will vary, and thus this Cabs 530 will vary with changes in the fly-height of slider 230 above surface 195.

Circuit 500 is comprised of an operational amplifier (op-mp) 510, a resistor R1 of approximately 50 kΩ, a capacitor C1 of approximately 40 pF, and an amplitude demodulator 540. R1 and C1 are connected in parallel between the output of op-amp 510 and the inverting input of op-amp 510. The inverting input of op-amp 510 is also coupled with slider 230 (for example via signal line 350). In this embodiment, op-amp 510 tries to make V+=V− by feedback. By applying a high frequency alternating current (AC) signal of low amplitude, such as, for example, a fly-height change sensing signal of Vs=200 mV (0 peak) at 3 Mhz to V+ of op-amp 510, then Vout=(1+Cabs/C1)Vs. Thus, fluctuations in Cabs 530 (due to fly-height changes) can be measured by monitoring the amplitude of Vout. Amplitude of Vout is at the sensing signal frequency (in this example, 3 MHz). This amplitude is extracted by use of a common circuit called "amplitude demodulator", represented by amplitude demodulator 540. The output from the amplitude demodulator 540 is substantially proportional to the slider fly-height. This demodulated "sensor voltage" is then coupled as an input voltage to electrostatic fly height controller 420. Because circuit 500 is part of a closed loop system, voltage source 520 represents the sum of all voltages applied to V+ of op-amp 510. This means that V+ receives the fly-height sensing signal, the fly height control signal, and in some cases the optional DC bias voltage.

As described, circuit 500 acts, through feedback, to maintain slider potential at a V− which is equal to V+. V− is maintained at V+ potential, within the bandwidth of op-amp 510 (thus, in this example requiring that op-amp 510 be capable of handling up to a 3 MHz signal). By using a low-voltage (for example, 200 mV (0 peak)) for V+, slider potential is also maintained at a low voltage. Maintaining slider potential at a low voltage prevents the attraction of lubricant and debris to the slider. Thus, as can be seen, circuit 500 provides a sensing circuit where the voltage potential of slider 230 is controlled by the feedback of operational amplifier 510.

FIG. 6 shows an example of another circuit 600 used in a capacitive fly-height change sensor 410, in an embodiment of the present technology. Circuit 600 is an example circuit configured to operate with the pico slider (previously described) which generates a steady state capacitance, Cabs 530, of approximately 36 pF in the air gap between slider 230 and surface 195 of disk 115. It is appreciated that the component values shown may vary with other sizes of sliders, or sliders having a steady state Cabs of a different value. In operation, the fly-height will vary, and thus this Cabs 530 will vary with changes in the fly-height of slider 230 above surface 195.

Circuit 600 is comprised of an op-amp 510, a resistor R1 of approximately 50 kΩ, a capacitor C1 of approximately 40 pF, an amplitude demodulator 540, a second op-amp 510' which is an identical op-amp to op-amp 510, a second capacitor R1' of approximately 50 kΩ, a second capacitor C1' of approximately 40 pF, and a dummy capacitor 630 which is a balance capacitor tuned to the value of Cabs 530 and then fixed at that value. R1 and C1 are connected in parallel between the output of op-amp 510 and the inverting input of op-amp 510. The inverting input of op-amp 510 is also coupled with slider 230 (for example via signal line 350). R1, C1, and op-amp 510 form a first capacitance sensing circuit coupled with slider 230 for measuring capacitance (Cabs 530) between slider 230 and surface 195 of disk 115.

In circuit 600, the non-inverting inputs and the outputs of op-amps 510 and 510' are coupled together. R1' and C1' are connected in parallel between the output of op-amp 510' and the inverting input of op-amp 510'. The inverting input of op-amp 510' is also coupled with dummy capacitor 630. R1', C1', and op-amp 510' form a second capacitance sensing circuit, which is equivalent to and parallel to the first capacitance sensing circuit formed by R1, C1, and op-amp 510. This second capacitance sensing circuit is coupled to dummy capacitance 610 to approximate a steady state capacitance between slider 230 and surface 195 of disk 115. This is an example of the previously described technique of differential sensing, which is used to reduce errors caused by coupling both sensing and driving signals to the same signal line.

In this example the first circuit formed by R1, C1, and op-amp 510 operates in the same fashion as described above with circuit 500. For example, op-amp 510 tries to make V+=V− by feedback. By applying a high frequency alternating current (AC) signal of low amplitude, such as, for example, a fly-height change sensing signal of Vs=200 mV (0 peak) at 3 Mhz to V+ of op-amp 510, then Vout=(1+Cabs/C1) Vs. Thus, fluctuations in Cabs 530 (due to fly-height changes) can be measured by monitoring the amplitude of Vout. Vout is at a high frequency (such as 3 MHz of the fly-height change sensing signal) as compared to the drive frequency (centered at, for instance 250 kHz). Amplitude demodulator 540 demodulates Vout from this high frequency into the "sensor voltage" which is then coupled as an input to electrostatic fly height controller 420. A difference in circuit 600, from circuit 500, is that the value of Vout (which is demodulated into the sensor voltage) is now further regulated, as it is the difference between the voltages at the common outputs of op-amps 510 and 510'. Thus, in circuit 600, Vout (which is demodulated into the sensor voltage) is provided as the difference between the output voltage of the first capacitance sensing circuit (R1, C1, and op-amp 510) and the output of the second capacitance sensing circuit (R1', C1', and op-amp 510'). Because circuit 600 is part of a closed loop system, voltage source 520 represents the sum of all voltages applied to V+ of op-amp 510. This means that V+ receives the fly-height sensing signal, the fly height control signal, and in some cases the optional DC bias voltage.

Circuit 600, as previously described, acts (through feedback) to maintain slider potential at a V− which is equal to V+. V− is maintained at V+ potential, within bandwidth of op-amp 510 (thus, in this example requiring that op-amp 510 be capable of handling up to a 3 MHz signal). By using a low-voltage (for example, 200 mV (0 peak) for V+, slider potential is also maintained at a low voltage. Maintaining slider potential at a low voltage prevents the attraction of lubricant and debris to the slider. Thus, as can be seen, circuit 600, like circuit 500, provides a sensing circuit where the voltage potential of slider 230 is controlled by the feedback of operational amplifier 510.

The fixed capacitance of C1 (in circuits 500 and 600) is chosen at 40 pF to "match" the steady state Cabs 530 of slider 230/disk surface 195. However, in the illustrated example, the steady state Cabs 530 typically fluctuates between 30 and 50 pF (depending on component variations), so in practicality there is almost always a difference/imbalance between C1 and steady state Cabs 530 which triggers an output of circuit 500. Circuit 600 minimizes or eliminates this inherent difference/imbalance, by use of a parallel capacitance sensing circuit (R1', C1', and 510') coupled to balance capacitor 630. Balance capacitor 630 is adjusted to the steady state value of Cabs 530 and then fixed. The parallel circuit (R1', C1', and 510') is then added to eliminate the inherent difference. When balance capacitor 630 is equal to the steady state Cabs 530, circuit 600 has an output of zero volts. This sets a zero volt initial start value and results in any output voltage (Vout) being as a result of a change in fly height rather than a difference between the fixed capacitor and the fluctuating design value of the Cabs. Thus the parallel circuit sets both the inverting and the non-inverting inputs of the op-amp equal until there is variation in fly height which causes a difference between the value of Cabs and the value of the tuned capacitance. The inherent output is eliminated and leaving only an output (Vout) triggered by fly-height changes. Again, since fly-height is substantially proportional to the amplitude of Vout at its sensing frequency (in this example, 3 MHz), a common circuit called an "amplitude demodulator", such as amplitude demodulator 540, is added to demodulate the amplitude from Vout. The output voltage from amplitude demodulator 540 is used as the sensor voltage at the input of fly-height controller 420.

Figure 7:
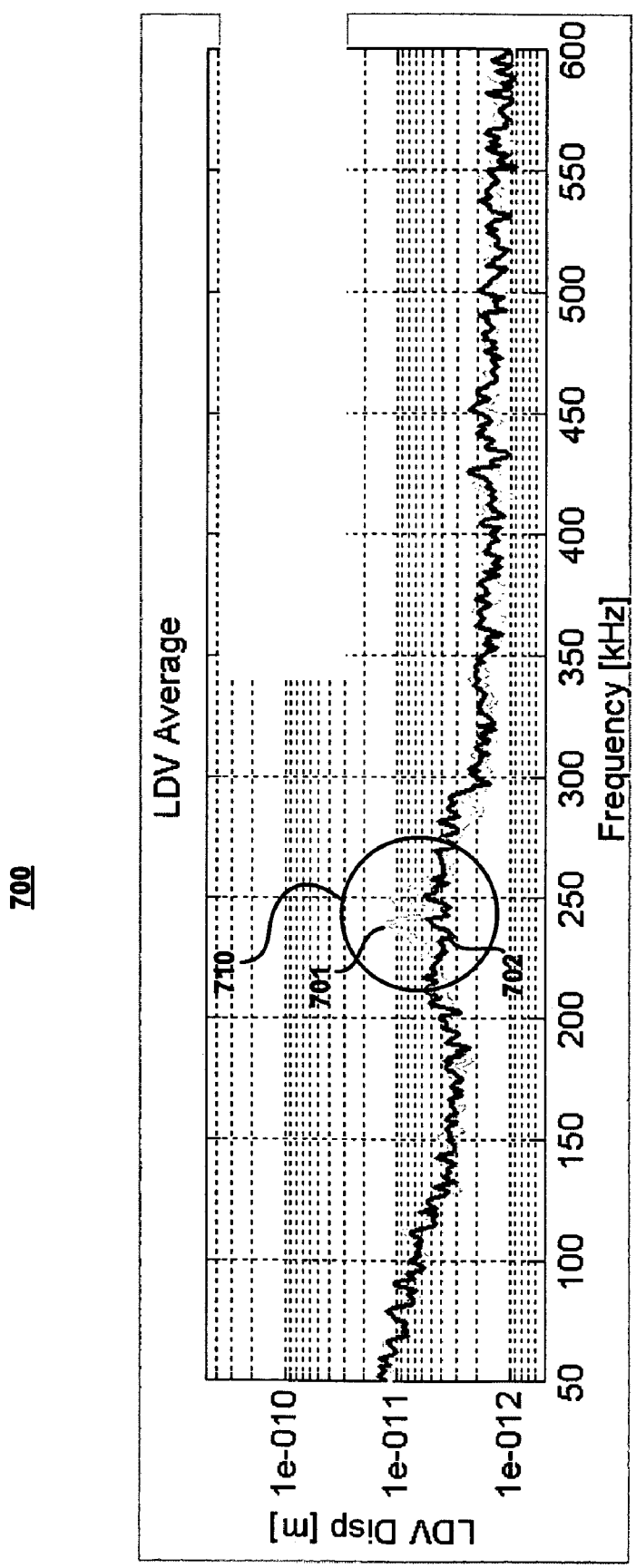
FIG. 7 shows exemplary graphs of slider displacement versus frequency with and without use of a mechanism for maintaining a constant fly-height of a slider, in accordance with an embodiment of the present technology.

FIG. 7 shows exemplary graphs 700 of slider displacement versus frequency with and without use of a mechanism for maintaining a constant fly-height of a slider, in accordance with an embodiment of the present technology. In graphs 700, line 701 shows a typical slider fly-height modulation spectrum as measured by a laser Doppler velocimeter (LDV). As can be seen in region 710, line 701 shows that the slider has a large resonance around 250 kHz. When feedback generated by fly height control mechanism 400 is turned on, line 702 shows the same slider fly-height modulation has been reduced by approximately one third in the frequency range between approximately 220 kHz and approximately 270 kHz. This indicates increased stability and increased control of slider fly-height.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mechanism for maintaining a constant fly-height of a slider, said mechanism comprising:
    a capacitive fly-height change sensor configured for coupling with a slider in a head gimbal assembly, said capacitive fly-height change sensor configured for measuring capacitance between said slider and a surface of a disk through the use of a fly-height change sensing signal, said capacitive fly-height change sensor further configured for outputting a sensor voltage which is substantially proportional to a sensed change in said capacitance; and
    an electrostatic fly-height controller coupled with said capacitive fly-height change sensor and configured to couple with said slider, said electrostatic fly-height controller configured to process said sensor voltage into a fly-height control signal for electrostatically maintaining a constant fly-height of said slider relative to said surface of said disk, said electrostatic fly-height controller including a voltage biaser configured for applying a small bias voltage to said slider such that a non-linear relationship between said fly-height control signal and a resultant electrostatic force between said slider and said surface of said disk becomes closer to a linear relationship.

2. The mechanism of claim 1, wherein said head gimbal assembly comprises:
    said slider;
    a suspension;
    an insulator layer disposed between said slider and said suspension such that said slider is isolated from said suspension; and
    an electrical coupling to said slider, said electrical coupling for simultaneously coupling said fly-height change sensing signal and said fly-height control signal to said slider.

3. The mechanism of claim 1, wherein said electrostatic fly-height controller comprises:
    a filter for selecting a frequency range of said fly-height control signal.

4. The mechanism of claim 3, wherein filter comprises:
    a band pass filter with a center frequency tuned substantially to a second pitch mode frequency of said slider.

5. The mechanism of claim 3, wherein said electrostatic fly-height controller further comprises:
    a phase shifter configured for shifting the phase of said fly-height control signal.

6. The mechanism of claim 1, wherein said capacitive fly-height change sensor comprises:
    a sensing circuit utilizing an operational amplifier, wherein a voltage potential of said slider is controlled by feedback of said operational amplifier.

7. The mechanism of claim 1, wherein said capacitive fly-height change sensing signal comprises:
    a small amplitude, high frequency signal coupled to said slider.

8. The mechanism of claim 1, wherein said capacitive fly-height change sensor comprises:
    a first capacitance sensing circuit coupled with said slider and configured for measuring said capacitance between said slider and said surface of said disk;
    a second capacitance sensing circuit equivalent to said first capacitance sensing circuit and coupled to a dummy capacitance, said dummy capacitance used to approximate a steady state capacitance between said slider and said surface of said disk; and
    a common output coupled to said electrostatic fly-height controller, said common output configured for providing a difference between an output voltage of said first capacitance sensing circuit and an output voltage of said second capacitance sensing circuit, said difference comprising an amplitude at a frequency of said fly-height change sensing signal such that demodulation of said difference achieves said sensor voltage.

9. A hard disk drive comprising:
    a housing;
    a disk pack mounted to said housing and having a disk that is rotatable relative to said housing, said disk pack defining an axis of rotation and a radial direction relative to said axis;
    an actuator mounted to said housing and being movable relative to said disk pack, said actuator having a slider containing heads for reading data from and writing data to said disk; and
    a mechanism for maintaining a constant fly-height of said slider above said disk, said mechanism comprising:
        a capacitive fly-height change sensor configured for coupling with a slider in a head gimbal assembly, said capacitive fly-height change sensor configured for measuring capacitance between said slider and a surface of a disk through the use of a fly-height change sensing signal, said capacitive fly-height change sensor further configured for outputting a sensor voltage which is substantially proportional to a sensed change in said capacitance; and
        an electrostatic fly-height controller coupled with said capacitive fly-height change sensor and configured to couple with said slider, said electrostatic fly-height controller configured to process said sensor voltage into a fly-height control signal for electrostatically maintaining a constant fly-height of said slider relative to said surface of said disk, said electrostatic fly-height controller including a voltage biaser configured for applying a small bias voltage to said slider such that a non-linear relationship between said fly-height control signal and a resultant electrostatic force between said slider and said surface of said disk becomes closer to a linear relationship.

10. The hard disk drive of claim 9, wherein head gimbal assembly comprises:
    said slider;
    a suspension;
    an insulator layer disposed between said slider and said suspension such that said slider is isolated from said suspension; and
    an electrical coupling to said slider, said electrical coupling for simultaneously coupling said fly-height change sensing signal and said fly-height control signal to said slider.

11. The hard disk drive of claim 9, wherein said electrostatic fly-height controller comprises:
    a filter for selecting a frequency range of said fly-height control signal.

12. The hard disk drive of claim 11, wherein filter comprises:
    a band pass filter with a center frequency tuned substantially to a second pitch mode frequency of said slider.

13. The hard disk drive of claim 11, wherein said electrostatic fly-height controller further comprises:
    a phase shifter configured for shifting the phase of said fly-height control signal.

14. The hard disk drive of claim 9, wherein said capacitive fly-height change sensor comprises:
   a sensing circuit utilizing an operational amplifier, wherein a voltage potential of said slider is controlled by feedback of said operational amplifier.

15. The hard disk drive of claim 9, wherein said capacitive fly-height change sensing signal comprises:
   a small amplitude, high frequency signal coupled to a said slider.

16. The hard disk drive of claim 9, wherein said capacitive fly-height change sensor comprises:
   a first capacitance sensing circuit coupled with said slider and configured for measuring said capacitance between said slider and said surface of said disk;
   a second capacitance sensing circuit equivalent to said first capacitance sensing circuit and coupled to a dummy capacitance, said dummy capacitance used to approximate a steady state capacitance between said slider and said surface of said disk; and
   a common output coupled to said electrostatic fly-height controller, said common output configured for providing a difference between an output voltage of said first capacitance sensing circuit and an output voltage of said second capacitance sensing circuit, said difference comprising an amplitude at a frequency of said fly-height change sensing signal such that demodulation of said difference achieves said sensor voltage.

17. A mechanism for maintaining a constant fly-height of a slider, said mechanism comprising:
   a means for measuring a capacitance between said slider and a surface of a disk through the use of a fly-height change sensing signal;
   a means for outputting a sensor voltage which is substantially proportional to a sensed change in said capacitance; and
   a means for processing said sensor voltage into a fly-height control signal for electrostatically maintaining a constant fly-height of said slider relative to said surface of said disk, said means for processing said sensor voltage into a fly-height control signal including a means for applying a small bias voltage to said slider such that a non-linear relationship between said fly-height control signal and a resultant electrostatic force between said slider and said surface of said disk becomes closer to a linear relationship.

18. The mechanism of claim 17 further comprising:
   a means for simultaneously applying said fly-height change sensing signal and said fly-height control signal to said slider while electrically isolating said slider from a suspension coupled with said slider.

* * * * *

UNITED STATES PATENT AND TRADEMARK OFFICE
CERTIFICATE OF CORRECTION

| | |
|---|---|
| PATENT NO. | : 7,450,333 B2 |
| APPLICATION NO. | : 11/647970 |
| DATED | : November 11, 2008 |
| INVENTOR(S) | : Toshiki Hirano and Bernhard E. Knigge |

It is certified that error appears in the above-identified patent and that said Letters Patent is hereby corrected as shown below:

On the Title Page, Item (75) Inventor Address reads "Sab Jose, CA (US)." It should read "San Jose, CA (US)".

Signed and Sealed this

Sixth Day of January, 2009

JON W. DUDAS
*Director of the United States Patent and Trademark Office*